United States Patent [19]

Ishibashi

[11] Patent Number: 4,568,165
[45] Date of Patent: Feb. 4, 1986

[54] FOCUS ADJUSTING DEVICE FOR CAMERA

[75] Inventor: Kenzo Ishibashi, Tokyo, Japan

[73] Assignee: Asahi Kogaku Kogyo Kabushiki Kaisha, Tokyo, Japan

[21] Appl. No.: 599,355

[22] Filed: Apr. 12, 1984

[30] Foreign Application Priority Data

May 24, 1983 [JP] Japan .................................. 58-89969

[51] Int. Cl.$^4$ ............................................ G03B 13/02
[52] U.S. Cl. .................................. 354/195.1; 352/140
[58] Field of Search ............ 354/400, 402, 409, 195.1, 354/195.13; 352/140

[56] References Cited

U.S. PATENT DOCUMENTS 4,176,935 12/1979 Smith ................................ 354/195.1
4,299,457 11/1981 Ducommun ........................ 352/140

Primary Examiner—Russell E. Adams
Attorney, Agent, or Firm—Sughrue, Mion, Zinn Macpeak & Seas

[57] ABSTRACT

A focusing adjusting device for a camera which uses the rotation of a motor shaft to move a photographing lens into focus includes an operating member which is movable to a number of positions. Each position of the operating member specifies a particular rotational direction and a particular rotational speed of the motor shaft. A detecting member is used for detecting the operating mode and the position of the operating member, and for generating detection signals in accordance with these detected parameters. Also provided is a rotation control circuit for receiving the detection signals and rotating the motor shaft at a direction and at a speed in accordance with the position and operating mode of the operating member.

14 Claims, 19 Drawing Figures

FIG. 4
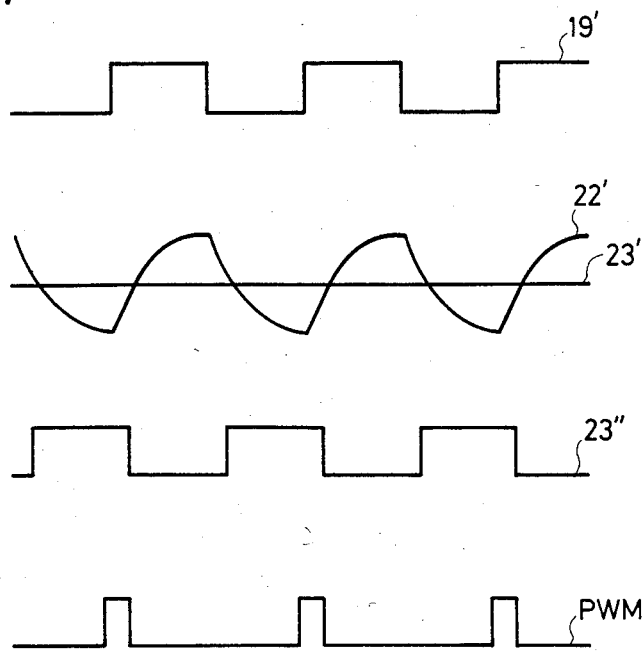
FIG. 5(A)  FIG. 5(B)  FIG. 5(C)
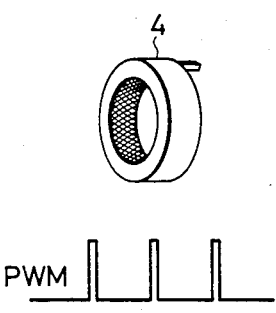 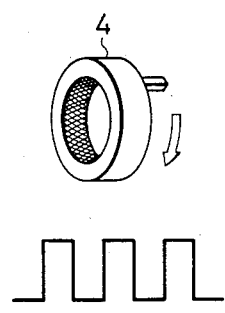 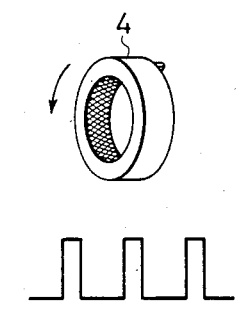
PWM   
Scw 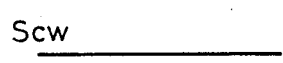 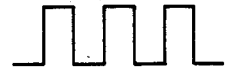 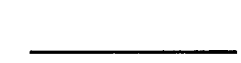
Sccw  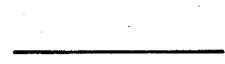 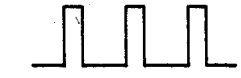

FOCUS ADJUSTING DEVICE FOR CAMERA

BACKGROUND OF THE INVENTION

The invention relates to a focus adjusting device which uses an electric motor for adjusting the focus of the photographing lens of a camera.

In a camera which uses an electric motor to automatically adjust the focus, in response to a control signal provided by an automatic focus detector, the automatic adjustment cannot always satisfactorily focus the lens on the object because of the nature of the object. As a result, an auxiliary manually operated focusing means is often used in combination with the automatic focusing means. The auxiliary focusing means uses a method in which the distance ring is manually turned, or a method in which a switch is manually operated to suitably rotate the motor. However, the former method is disadvantageous in that performing the manual focusing operation after the automatic focusing operation is rather troublesome, and the latter method is disadvantageous in that it is difficult to provide a proper timing instruction to a high speed motor and if the motor is run at low speed it takes a relatively long time to set the lens at the focusing position. Furthermore, another method has been proposed in which the motor speed is changed between high and low speeds by operating a switch in two steps. However, this method is also disadvantageous in that the high speed cannot be smoothly switched over to the low speed.

SUMMARY OF THE INVENTION

Accordingly, an object of this invention is to eliminate the above-described difficulties accompanying a motor-driven automatic focusing camera. The object is obtained by providing a camera focus adjusting device in which the rotational speed of a motor, used to adjust the focus of the photographing lens, is smoothly controlled over a range of low to high speeds by operating an operating member. When the operating member is at its natural return position the motor is automatically stopped so that the camera's operability is improved. Furthermore, the high speed, the low speed and the stop of the motor are quickly instructed so that the focus adjusting speed and the focus adjusting accuracy are improved. The focus adjustment by the operating member and the automatic focus adjustment by the automatic focus detecting device are switched over to each other by a simply operating change-over means.

BRIEF DESCRIPTION OF THE DRAWINGS

FIG. 4 and parts (A), (B) and (C) of FIG. 5 are voltage waveform diagrams showing the operation of the motor control section of FIG. 3.

DETAILED DESCRIPTION OF THE INVENTION

Preferred embodiments of this invention will be described with reference to the accompanying drawings.

Figure 1:
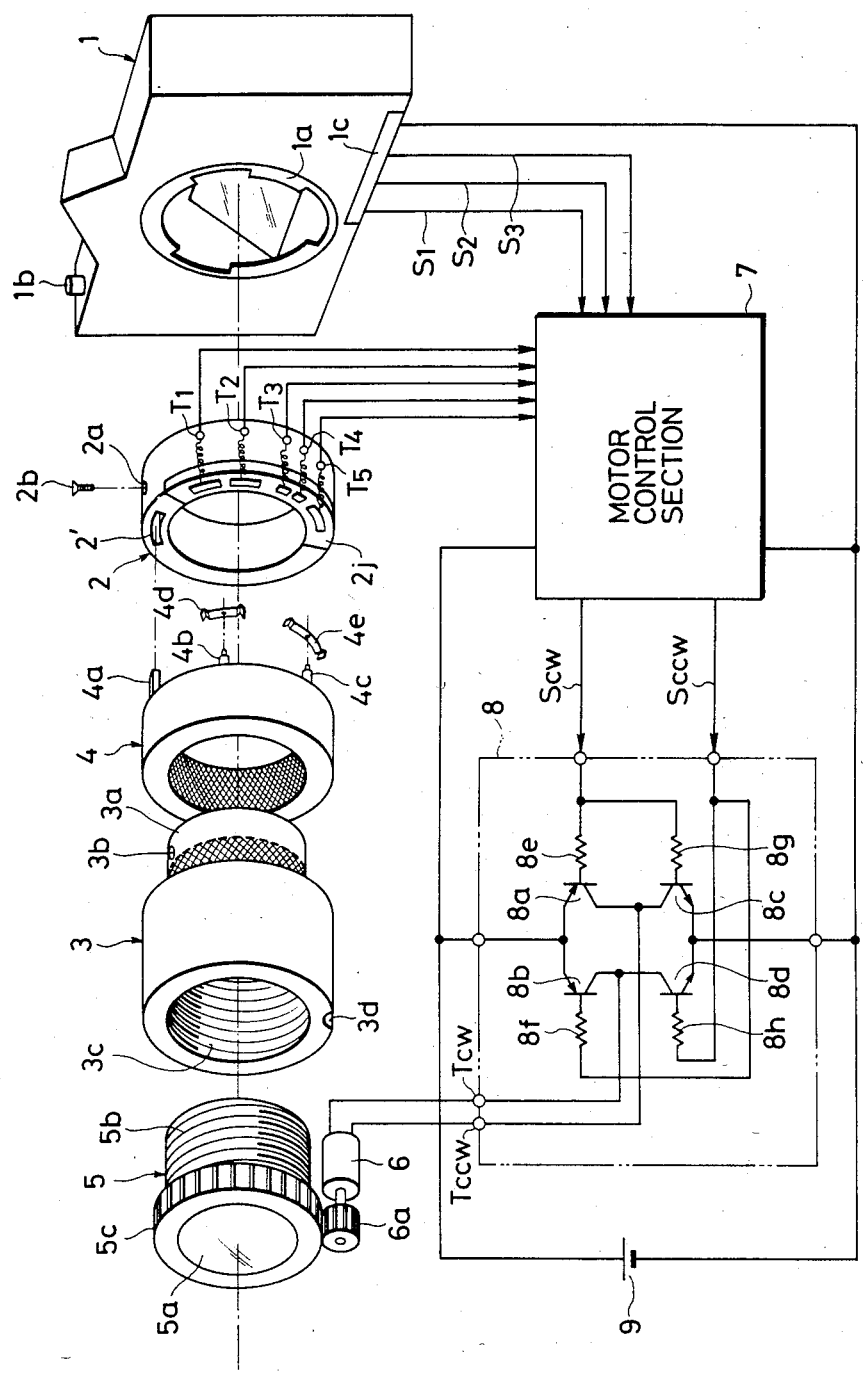
FIG. 1 is an explanatory diagram showing a first embodiment of this invention.

FIG. 1 shows a stationary lens barrel 2 mounted on the mount 1a of a camera body 1. An operating member, namely, a movable ring 4 is slidably mounted on the engaging part 3a of another stationary lens barrel 3. The stationary lens barrel 3 is engaged with the stationary lens barrel 2. The stationary lens barrels are positioned relative to each other by aligning the screw holes 2a and 3b, and are then secured to each other by screw 2b.

A rotary lens barrel 5 has a photographing lens 5a and a helicoid thread 5b which is engaged with the helicoid thread 3c of the stationary lens barrel 3. Accordingly, as the rotary lens barrel 5 is rotated clockwise it is moved into the stationary lens barrel 3; and as it is rotated counterclockwise it is extended out of the stationary lens barrel 3. A motor 6 is fixedly provided in a groove 3d, which is cut into the stationary lens barrel 3, and has a gear 6a engaged with the gear 5c of the rotary lens barrel 5. When the motor 6 is rotated in one direction, the rotary lens barrel 5 is rotated in the opposite direction, thereby causing the rotary lens barrel 5 to move into or out of the stationary lens barrel 3.

Figure 2A:
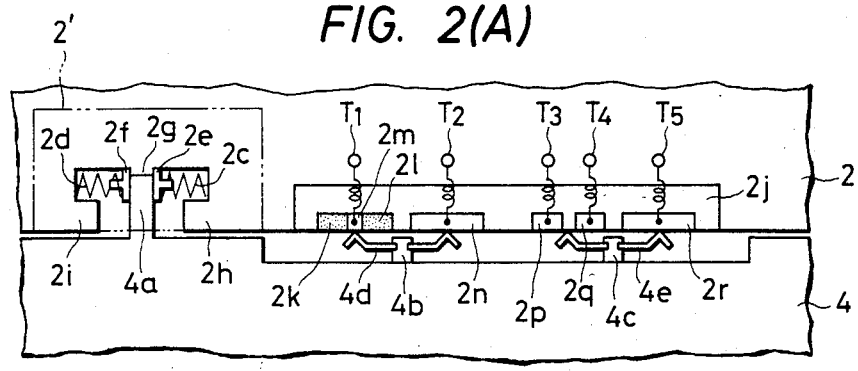
FIG. 2 is an explanatory diagram showing the operation of a mechanism in the device of FIG. 1.
Figure 2B:
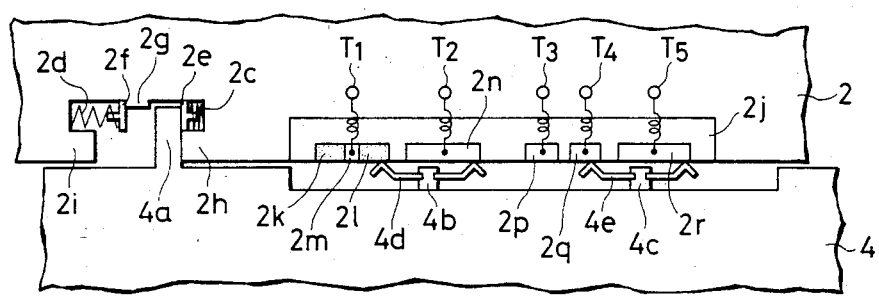
Figure 2C:
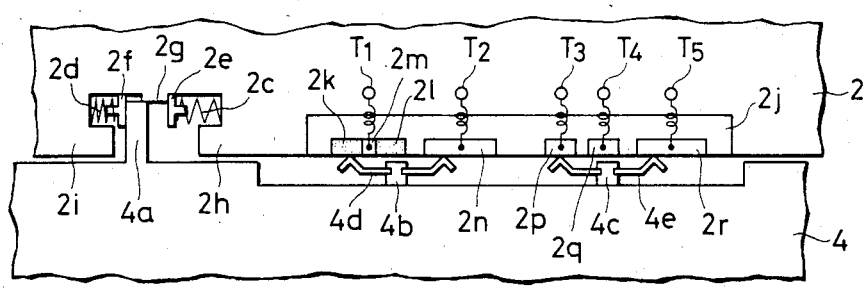

The stationary lens barrel 2 has a movable ring control section 2' which is coupled to the protrusion 4a of the movable ring 4. FIG. 2 is an unfolded explanatory diagram of the coupling between the movable ring control section 2' and the protrusion 4a, and shows compression springs 2c and 2d locked to both sides of a locking member 2g through spring receivers 2e and 2f. The compression springs and protrusion 4a are shown in their restored position in part (A) of FIG. 2. In this case, the protrusion 4a between the spring receivers 2e and 2f is released from the energization of the spring receivers 2e and 2f, and the movable ring 4 takes the stop specified by the position of the motor 6. The movable ring 4 is rotatable clockwise and counterclockwise, as shown in parts (B) and (C) of FIG. 2, from its restored position shown in part (A) of FIG. 2. When the movable ring 4 is turned clockwise, against the compression spring 2c, the protrusion 4a is locked to one limit end 2h. When the movable ring 4 is turned counterclockwise, against the compression spring 2d, the protrusion 4a is locked to another limit end 2i. These locking positions define the operating range of the movable ring 4. As the movable ring 5 is displaced clockwise from its restored position, as shown in the part (B) of FIG. 2, the motor 6 increases its speed while turning clockwise. As the movable ring 4 is displaced counterclockwise from its restored position, as shown in the part (C) of FIG. 2, the motor 6 increases its speed while turning counterclockwise.

The stationary lens barrel 2, shown in FIG. 2, has an insulator 2j on which are provided resistors 2k and 2l, a conductor 2m, disposed between the resistors, and conductors 2n, 2p, 2q and 2r. An electrode $T_1$ is connected to the conductor 2m, and electrodes $T_2$ through $T_5$ are connected to the conductors 2n, 2p, 2q and 2r, respectively. The movable ring 4 carries holders 4b and 4c, made of insulating material, to which electrical brushes 4d and 4e, respectively, are attached. When the movable ring 4 is in the restored state, as shown in part (A) of FIG. 2, the electrodes $T_1$ and $T_2$ are short-circuited through the brush 4d, and the electrodes $T_3$, $T_4$ and $T_5$ are electrically disconnected from each other. When the movable ring 4 is turned clockwise, as shown in part (B) of FIG. 2, the resistor 2*l* is interposed as a variable resistor between the electrodes $T_1$ and $T_2$, and the electrodes $T_4$ and $T_5$ are electrically connected to each other. When the movable ring 4 is turned counterclockwise, as shown in part (C) of FIG. 2, the resistor 2*k* is interposed as a variable resistor between the electrodes $T_1$ and $T_2$, and the electrodes $T_3$ and $T_5$ are electrically connected to each other.

An automatic-manual change-over switch 1*b* is provided on the camera body 1. Signals $S_1$, $S_2$ and $S_3$ are generated from an automatic focus detecting device 1*c*, provided on the camera body 1. The switch 1*b* switches between automatic focus control according to the signals $S_1$, $S_2$ and $S_3$ and control according to signals from electrodes $T_1$ through $T_5$, which are provided by rotation of the movable ring 4.

Figure 3:
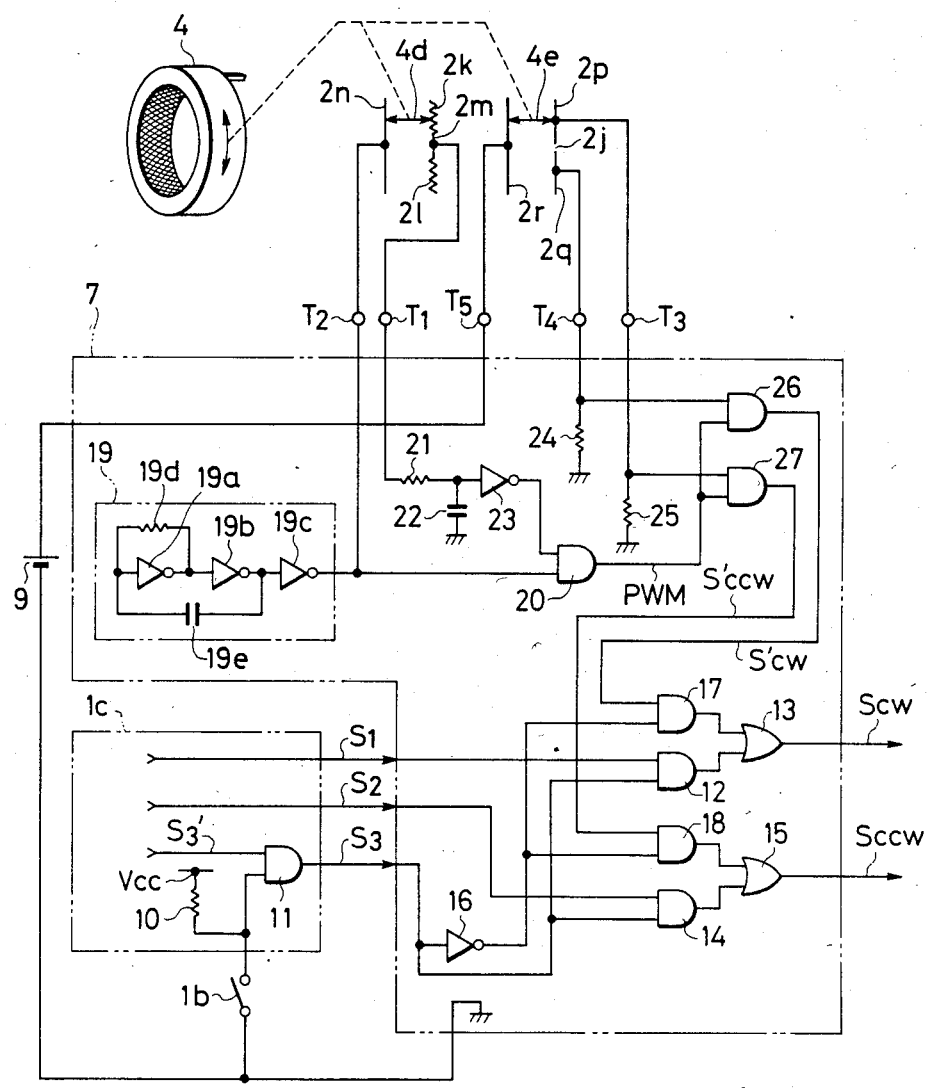
FIG. 3 is a circuit diagram showing the motor control section of FIG. 1 in detail.

A motor control section 7 is shown in detail in FIG. 3. In the motor control section 7, with the aid of the signals $S_1$, $S_2$ and $S_3$ or the signals from the electrodes $T_1$ through $T_5$, the output signals $S_{CW}$ and $S_{CCW}$ are generated as high or low level signals limited in pulse width. According to the combinations of these signals, a motor drive section 8 stops the motor 6 or rotates it clockwise or counterclockwise. The pulse width is utilized to control the speed of the motor 6.

The automatic-manual change-over switch 1*b* has one terminal connected to the negative terminal of a camera electric source 9. The negative terminal is at ground potential (low level). A positive potential Vcc is applied through a resistor 10 to the other terminal of the change-over switch 1*b*. When the change-over switch 1*b* is opened as shown in FIG. 3, automatic focus control by detection signals $S_1$ and $S_2$ from the automatic focus detecting device is effected. More specifically, an AND circuit 11 is enabled so that an automatic focus specifying signal $S_{3'}$ is gated through the AND circuit 11 so that the signal $S_3$ is obtained. When the signal $S_{3'}$ specifies automatic focus control and is at a high level, the signal $S_1$ is transmitted as the signal $S_{CW}$ through an AND circuit 12 and an OR circuit 13, while the signal $S_2$ is transmitted as the signal $S_{CCW}$ through an AND circuit 14 and an OR circuit 15. When the switch 1*b* is closed or the signal $S_{3'}$ is at a low level, indicating that automatic focus control is not operative, the output of the AND circuit 11 is applied through an inverter 16 to enable AND circuits 17 and 18 for gating the signals $S'_{CW}$ and $S'_{CCW}$ through the AND circuits 17 and 18 thereby, transmitting these signals through OR circuits 13 and 15 as the signals $S_{CW}$ and $S_{CCW}$, respectively, similarly as in the above-described case.

A conventional square wave generating circuit 19 comprises inverters 19*a*, 19*b* and 19*c*, a resistor 19*d* and a capacitor 19*e*. The circuit 19 applies a square wave 19' (in FIG. 4) to an AND circuit 20 and the electrode $T_2$. The variable resistor, formed between the electrodes $T_1$ and $T_2$ by the resistor 2*k* or 2*l*, the electrical brush 4*d*, operated in association with the movable ring 4, a resistor 21 and a capacitor 22 form an integrating circuit whose time constant is changed by the square wave signal from the square wave generating circuit 19. The integrating circuit supplies a signal 22', having a waveform as shown in FIG. 4, to an inverter 23. The inverter 23 has a threshold value 23' as shown in FIG. 4. The output signal of the inverter 23, as indicated at 23" in FIG. 4, has a waveform the fall of which occurs later than the rise of the square wave 19'. The AND circuit 20, receiving the square wave 19' and the signal 23", outputs a pulse width modulation signal PWM as shown in FIG. 4, so that as the resistance between the electrodes $T_1$ and $T_2$ increases, the pulse width is increased.

The electrode $T_5$ is connected to the positive terminal of the electric source 9, and the electrodes $T_3$ and $T_4$ are grounded through resistors 24 and 25 and are connected to AND circuits 26 and 27, respectively. Therefore, when the movable ring 4 is turned clockwise to cause the electrical brush 4*e* to short-circuit the electrodes $T_4$ and $T_5$, the AND circuit 26 is enabled so that the signal PWM is gated through the AND circuit 26 and is provided as the signal $S'_{CW}$. When the movable ring is turned counterclockwise to cause the brush 4*e* to short-circuit the electrodes $T_3$ and $T_5$, the AND circuit 27 is enabled so that the signal PWM is gated through the AND circuit 27 and is provided as the signal $S'_{CCW}$. When the movable ring 4 is released so that the electrical brush 4*e* is on the insulator 2*j*, the signal PWM is not gated through either one of the AND circuits 26 and 27. When the automatic-manual change-over switch 1*b* is closed or the signal $S_{3'}$ is at a low level, the signal $S'_{CW}$ is outputted as the signal $S_{CW}$ through the AND circuit 17 and the OR circuit 13, while the signal $S'_{CCW}$ is outputted as the signal $S_{CCW}$ through the AND circuit 18 and the OR circuit 15.

The motor drive section 8 comprises transistors 8*a*, 8*b*, 8*c* and 8*d* and base resistors 8*e*, 8*f*, 8*g* and 8*h*. The transistors 8*a* through 8*d* are bridge-connected. The positive terminal of the electrical source 9 is connected to the emitters of the PNP transistors 8*a* and 8*b*, and the negative terminal is connected to the emitters of the PNP transistors 8*c* and 8*d*. The collectors of the transistors 8*b* and 8*d* are connected to one terminal $T_{CW}$ of the motor 6, while the collectors of the transistors 8*a* and 8*c* are connected to the other terminal $T_{CCW}$ of the motor 6. The signals $S_{CW}$ and $S_{CCW}$, outputted by the motor control section 7, are applied to the bases of the transistors 8*a* and 8*c* and the bases of the transistors 8*b* and 8*d*, respectively. According to the combinations of the high and low levels of the signals $S_{CW}$ and $S_{CCW}$, the transistors 8*a*, 8*b*, 8*c* and 8*d* are turned on and off so as to short-circuit the terminals $T_{CW}$ and $T_{CCW}$ of the motor 6, to stop the motor or to change the direction of flow of current in order to determine the direction of rotation of the motor, as indicated in the following table:

TABLE

| Input | Signal | Transistor | | | | |
| --- | --- | --- | --- | --- | --- | --- |
| $S_{CW}$ | $S_{CCW}$ | 8a | 8b | 8c | 8d | Motor |
| L | L | ON | ON | OFF | OFF | Stop |
| H | L | OFF | ON | ON | OFF | Turn clockwise |
| L | H | ON | OFF | OFF | ON | Turn counter-clockwise |
| H | H | OFF | OFF | ON | ON | Stop |

The operation of the focus adjusting device thus organized will be described mainly in reference to the manual focus adjustment.

When the automatic-manual change-over switch 1*b* is closed or when the signal $S_{3'}$ of the automatic focus detecting device 1*c* is at a low level, the AND circuits 12 and 14 in the motor control circuit are disenabled while the AND circuits 17 and 18 in the motor control circuit are enabled, so that the resulting detection signals $S_1$ and $S_2$ from the automatic focus detecting device 1*c* are not gated through the AND circuits 12 and 14 and instead the manual focus adjusting signals $S'_{CW}$ and $S'_{CCW}$, generated by the electrodes $T_1$ through $T_5$, are gated through the AND circuits 17 and 18. When the movable ring 4 is in the restored state, as shown in part (A) of FIG. 2, the electrodes $T_1$ and $T_2$ (FIG. 2) are short-circuited and accordingly the time constant of the integrating circuit, for the signal from the square wave generating circuit 19, is determined by the resistor $2l$ and the capacitor 22. Accordingly, the gradient of the waveform of the signal $22'$ in FIG. 4 is made steep, and the pulse width of the pulse width modulation signal PWM is decreased as shown in part (A) of FIG. 5. Additionally, when the ring 4 is in the restored state, both of the electrodes $T_3$ and $T_4$ are disconnected from the electrical source 9, and the AND circuits 26 and 27 are disenabled. Therefore, the signals $S'_{CW}$ and $S'_{CCW}$ are set to the low level and the signals $S_{CW}$ and $S_{CCW}$ are also set to the low level. Accordingly, the transistors 8a, 8b, 8c and 8d are turned on, on, off and off, respectively, as indicated in the table and the motor 6 is stopped, in that no voltage potential difference is applied across its terminals.

In order to focus the lens on a relatively near object, the movable ring 4 is turned clockwise, as shown in part (B) of FIG. 2, for instance until it is locked, then the resistance between the electrodes $T_1$ and $T_2$ becomes a maximum and the pulse width modulation signal PWM has the maximum pulse width as indicated in part (B) of FIG. 5. Because the electrodes $T_4$ and $T_5$ are short-circuited, the signal PWM is provided as the signal $S'_{CW}$ through the AND circuit 26, and the signal $S'_{CW}$ is outputted as the signal SCW through the AND circuit 17 and the OR circuit 13. Thus, with the signal $S_{CW}$ at a high level and with the signal $S_{CCW}$ at a low level, as indicated in the table, the motor is turned clockwise. The motor is rotated at the highest speed, because of the pulse width of the signal $S_{CW}$ (see part (B) of FIG. 5), which as mentioned above is at its maximum. The force of locking the movable ring 4 is reduced when the desired focus adjustment is approached, and the movable ring 4 is returned counterclockwise, as a result of which the pulse width is decreased and the motor 6 is run at low speed. When the movable ring 4 is further released, it is restored, as shown in part (A) of FIG. 2, and the motor 6 is stopped. During this period, the rotary lens barrel 5 is extended while being turned counterclockwise, so that the lens is focused on the object at the short distance.

In order to focus the lens on an object at a long distance, the movable ring 4 is turned counterclockwise, as indicated in part (C) of FIG. 2, then the resistance between the electrodes $T_1$ and $T_2$ is increased. Part (C) of FIG. 5 shows the waveforms which are obtained when the movable ring 4 is turned to the middle of its opeating range. The pulse width of the pulse width modulation signal PWM in part (C) of FIG. 5 is smaller than that of the signal PWM in part (B) of FIG. 5. Because the electrodes $T_3$ and $T_5$ are short-circuited, the signal PWM is provided as the signal $S'_{CCW}$, and the signal $S'_{CCW}$ is outputted as the signal $S_{CCW}$. Thus, with the signal $S_{CCW}$ at a high level and the signal $S_{CW}$ at a low level, as indicated on the table, the motor 6 is rotated counterclockwise, and the lens is focused on the object at the long distance. Furthermore, because the pulse width of the signal PWM in part (C) of FIG. 5 is smaller than that of the signal PWM in part (B) of FIG. 5 the motor is rotated at a speed lower than its highest speed.

In the table, the condition when the signals $S_{CW}$ and $S_{CCW}$ are both at a high level results when the detection signals $S_1$ and $S_2$, from the automatic focus adjustment, are both at a high level, thereby specifying the stop of the motor 6.

Figure 6A:
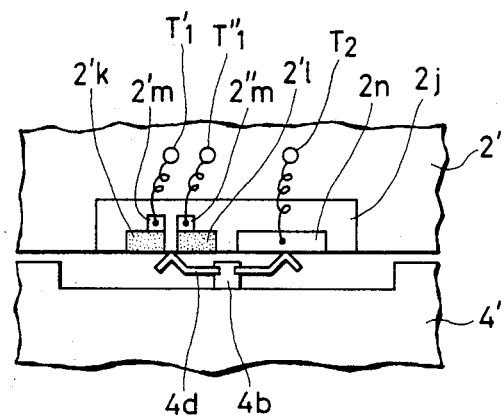
FIGS. 6, 7 and 8 are circuit diagrams showing second, third and fourth embodiments of the invention which are obtained by modifying the first embodiment.
Figure 6B:
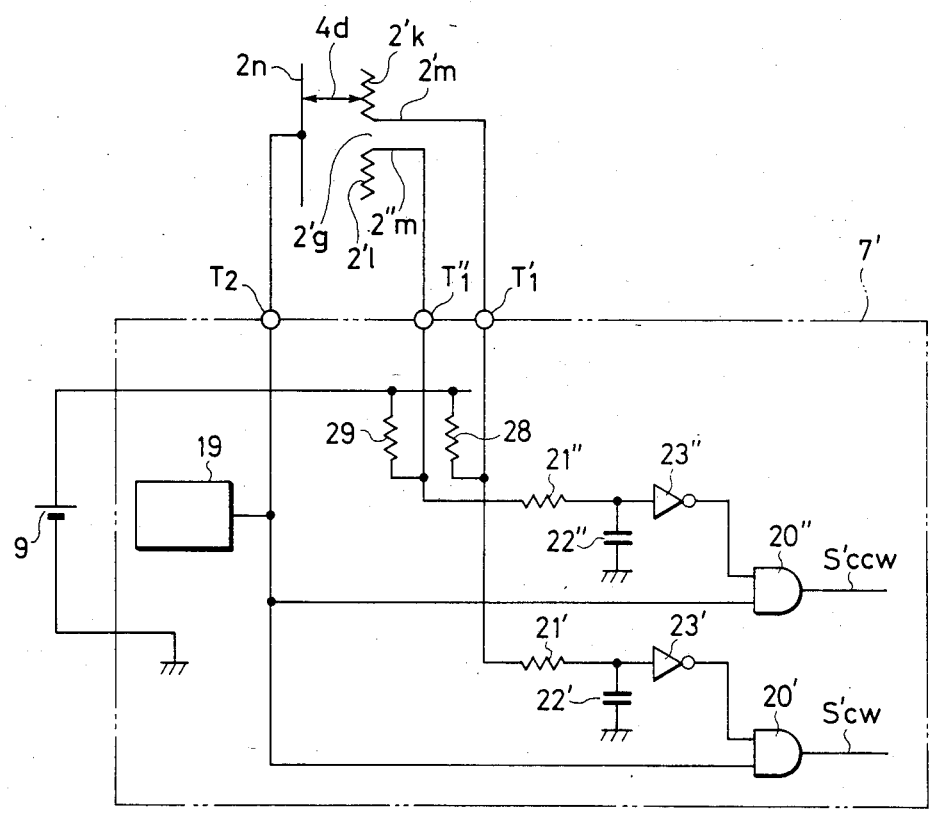

Parts (A) and (B) of FIG. 6 show a second embodiment of the invention, in which the components concerning the electrodes $T_3$, $T_4$ and $T_5$ in FIGS. 1 through 3 are eliminated. In parts (A) and (B) of FIG. 6, those components which have been described with reference to FIGS. 1 through 3 are accordingly designated by the same reference numerals or characters or by the same reference numerals or characters with the mark (') or (").

Resistors $2'k$ and $2'l$ have conductors $2'm$ and $2''m$ connected at their ends, respectively. The conductors $2'm$ and $2''m$ are in turn connected to electrodes $T'_1$ and $T''_1$, respectively. When one end of the electrical brush 4d is located between the resistors $2'k$ and $2'l$ as shown in part (A) of FIG. 6, the one end is on an insulator $2'j$ and the electrodes $T'_1$ and $T''_1$ are electrically disconnected from the electrode $T_2$. This position of protrusion 4b corresponds to the restored state shown in part (A) of FIG. 2. When the electrical brush 4d is moved right, the resultant state corresponds to the state shown in part (B) of FIG. 2. When the brush 4d is moved left, the resultant state corresponds to the state shown in part (C) of FIG. 2. In part (B) of FIG. 6 the resistance of the resistors 28 is much larger than those of the resistors $2'k$ and $21'$. Therefore, when the electrical brush 4d is not in contact with the resistor $2'k$, the pulse width modulation signal $S'_{CW}$ (being the same as the signal S'CW in FIG. 3) is set to a low level. Similarly, the resistance of the resistor 29 is much larger than those of the resistors $2'l$ and $21''$. Therefore, when the brush 4d is not in contact with the resistor $2'l$, the pulse width modulation signal $S'_{CCW}$ (being the same as the signal $S'_{CCW}$ in FIG. 3) is set to a low level. These signals are applied to the circuit shown in FIG. 1 to control the motor 6.

Figure 7:
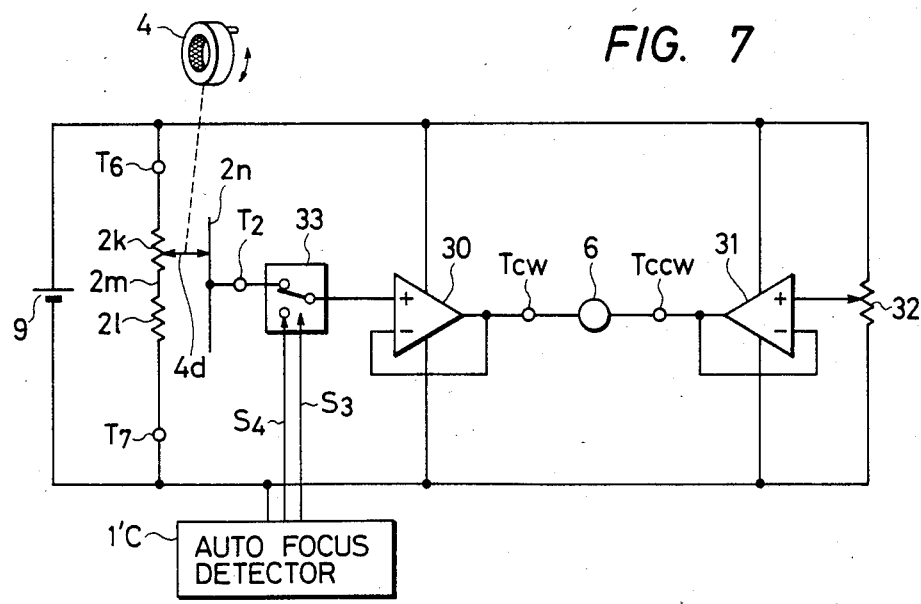

FIG. 7 shows a third embodiment of the invention in which a DC voltage applied to the motor 6 is variable. In FIG. 7, operational amplifiers 30 and 31 form a voltage follower. The potential at the noninversion input terminal of the operational amplifier 31 is adjusted to one-half ($\frac{1}{2}$) of the potential of the electric source 9 by an adjusting resistor 32. An automatic focus detector $1'c$ provides a signal $S_3$ similar to that in FIG. 3 and a detection signal $S_4$ indicative of the DC voltage level. Electrodes $T_6$ and $T_7$ are connected to the positive and negative terminals, respectively of the electric source 9. When the electrical brush 4d is in contact with the conductor $2m$, one-half ($\frac{1}{2}$) of the potential of the electric source 9 is applied to the electrode $T_2$. When the electrical brush 4d is shifted to the resistor $2k$, a positive potential is applied to the electrode $T_2$, and when it is shifted to the resistor $2l$, a negative potential is applied to the electrode $T_2$; that is, as the electrical brush is shifted, the potential applied to the electrode $T_2$ is varied. In response to the signal $S_3$, a selecting switch 33 selects the signal from the electrode $T_2$ or the signal $S_4$, and applies the selected signal to the noninversion input terminal of the operational amplifier 30. When the potential at the terminal $T_{CW}$ is higher than that at the terminal $T_{CCW}$, the motor 6 is rotated clockwise, and when the potential at the terminal $T_{CW}$ is lower than that at the terminal $T_{CCW}$, the motor 6 is rotated counterclockwise. Similarly as in the second embodiment, in the third embodiment shown in FIG. 7 the angular position detecting members concerning the electrodes $T_3$, $T_4$ and $T_5$ can be eliminated.

Figure 8:
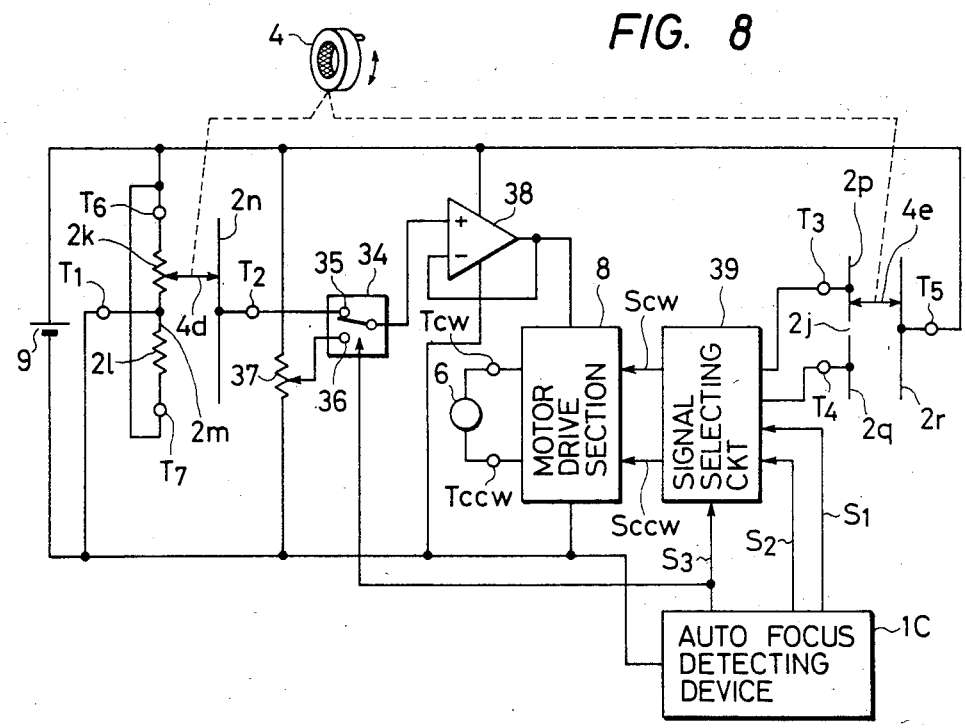
Figure 9A:
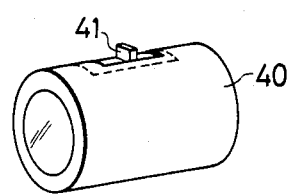
FIG. 9 (A) through (F) are perspective views showing examples of an operating member of the device according to the invention.
Figure 9B:
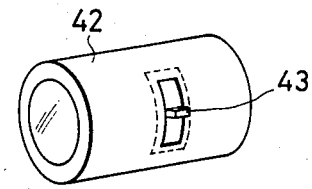
Figure 9C:
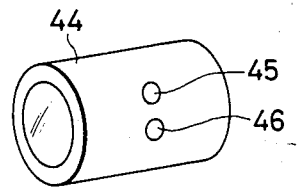
Figure 9D:
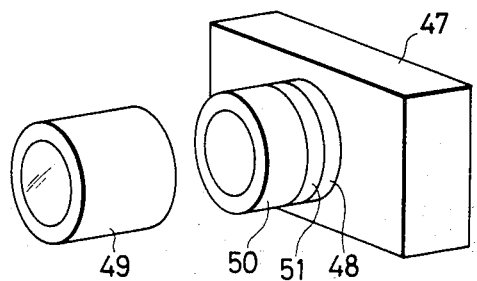
Figure 9E:
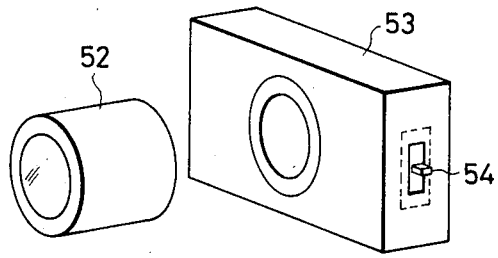
Figure 9F:
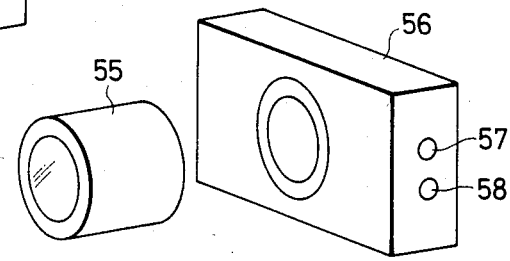

FIG. 8 shows a fourth embodiment of the invention in which, similarly as in the third embodiment, a DC voltage applied to the motor 6 is varied. The electrode $T_1$ is connected to the negative terminal of the electric source 9, and electrodes $T_6$ and $T_7$ are connected to the positive terminal of the electric source 9. When the electrical brush 4d is in contact with the conductor 2m, a zero potential is applied to the electrode $T_2$. As the brush 4d is shifted to the resistor 2k or 2l, a variable potential which ranges from zero potential to the potential of the electric source 9 is applied to the electrode $T_2$. One terminal 35 of a selecting switch 34 is connected to the electrode $T_2$ to receive the potential at the electrode $T_2$, and the other terminal 36 is connected through a variable resistor to the electric source 9 to receive a divided potential of the electric source 9. In response to a signal $S_3$ from the automatic focus detector 1c, which is similar to the signal $S_3$ in FIG. 3, the selecting switch 34 selects the potential at the terminal 35 or 36 and applies the selected potential to the non-inversion input terminal of an operational amplifier 38. The operational amplifier 38 forms a voltage follower, the output of which is applied to the collectors of the transistors 8a and 8b of the motor drive section 8, shown in FIG. 1. The electrode $T_5$ is coupled to the electrode $T_3$ or $T_4$ depending on the position of brush 4e, similarly as in the case of FIG. 3. A signal selecting circuit 39, receives the signals from the electrodes $T_3$ and $T_4$, and outputs the continuous signals $S_{CW}$ and $S_{CCW}$ at a high or low level through a circuit in which the electrodes $T_3$ and $T_4$ are directly connected to the AND circuits 17 and 18 of FIG. 3. The signals $S_1$, $S_2$ and $S_3$, from the automatic focus detector 1c, are applied to the AND circuits 12, 14, 17 and 18 as shown in FIG. 3. For instance when the electrode $T_2$ is connected to the terminal 35 of the selecting switch 34 and the electrical brush 4e short-circuits the electrodes $T_3$ and $T_5$, as shown in FIG. 8, similarly as in the case of part (C) of FIG. 2, the signal $S_{CW}$ is at a low level while the signal $S_{CCW}$ is at a high level so that the motor 6 is rotated counterclockwise.

In each of the above-described embodiments, the movable ring 4 is employed as the operating member; however, the installation position of the operating member and the operating method may be changed, as shown in FIG. 9.

In part (A) of FIG. 9, a slide plate 41 is mounted on a lens barrel 40, and it is moved in the axial direction of the lens. The middle of the slide plate's operating range is the natural restoration point. In part (B) of FIG. 9, a slide plate 43 is mounted on a lens barrel 42, and it is moved circumferentially. In part (C) of FIG. 9, a push button for specifying the direction of rotation of the motor and a push button for specifying a varied speed of the motor are provided on a lens barrel 44, and the push buttons are capable of assuming a natural restoration position. In part (D) of FIG. 9, a movable ring 51 is provided on the mount 48 of a camera body and a mount 50 on which a lens 49 is mounted. In part (E) of FIG. 9, a slide plate 54 is provided on a camera body on which a lens barrel 52 is mounted. In part (F) of FIG. 9, push buttons 57 and 58 are provided on a camera body 56 on which a lens barrel 55 is mounted. In addition, a method (not shown) may be employed in which the operating member is provided outside the camera, and its operating data are transmitted to the motor rotation control circuit through hard wire or by radio wave.

As is apparent from the above description, according to the invention, the focus adjusting speed can be continuously controlled by changing the position of the operating member. When the lens is not close to the focusing position, i.e., it is necessary to move the lens a long distance, the speed of movement of the lens is increased so that the lens approaches the focusing position quickly. As the lens approaches the focusing position, the speed of movement of the lens is decreased. Thus, the lens can be set at the focusing position with high accuracy. Since the high speed is smoothly shifted to the low speed, the focusing operation is achieved smoothly at all times. The focus adjustment by the operating member can be used commonly with the focus adjustment by the automatic focus detecting device, and these focus adjustments can be switched over to each other automatically or by a simple operation. Therefore, the device is effective when the automatic focus detection cannot by itself result in proper focusing of the photographic lens.

I claim:

1. A focus adjusting device for a camera which uses the rotation of a motor shaft to move a photographing lens into focus, said device comprising:
   at least one operating member, for controlling the direction of rotation of said motor shaft, movable from a natural restoration position to a plurality of positions, each of said plurality of positions specifying a direction of rotation of said motor and a speed of rotation of said motor;
   an operating position detecting member for detecting the position of said operating member, and for generating detection signals in accordance with said detected position; and
   a rotation control circuit for receiving said detection signals and rotating said motor shaft in said direction corresponding to said position of said operating member and at a speed proportional to the amount of movement of said operating member from said natural restoration position.

2. A device as claimed in claim 1, wherein said operating member is movable in at least first and second directions from said natural restoration position, said motor shaft not being rotated when said operating member is at said natural restoration position, said motor shaft being rotated in one direction when said operating member is moved in said first direction, and said motor shaft being rotated in a direction opposite said one direction when said operating member is moved in said second direction.

3. A device as claimed in claim 1, wherein said operating member is a movable ring.

4. A device as claimed in claim 2, wherein said operating member is a movable ring.

5. A device as claimed in claim 1 wherein said device is capable of operating in first and second modes, said device further comprising a switching means, said switching means having at least first and second positions for determining said operating mode of said operating member, wherein when said switching means is in said first position said operating position detecting member is always enabled for generating said detection signals and when said switching means is in said second position said operating position detecing member is selectively enabled for generating said detection signals.

6. A device as claimed in claim 1, wherein said operating member comprises at least two push buttons, said push buttons being biased towards said restoration position and wherein said motor shaft is not rotated when said buttons are in said restoration position, said motor shaft being rotated in one direction when one of said buttons is displaced from said restoration position, said motor shaft being rotated in an opposite direction from said one direction when the other one of said buttons is displaced from said restoration position, the speed of rotation of said motor shaft being proportional to the amount of displacement of the respective button from its restoration position.

7. A device as claimed in claim 1, said operating position detecting member comprising variable resistance means, the resistance of said variable resistance means varying in accordance with the position of said operating member, and said rotation control circuit comprising means for applying a variable voltage to said motor, the voltage applied to said motor varying in accordance with the resistance of said variable resistance means.

8. A device as claimed in claim 9, said variable voltage applying means comprising a pulse width modulation circuit for supplying width varying pulses of current to said motor, said pulse widths varying in accordance with the resistance of said variable resistance means.

9. A device as claimed in claim 1, said device further comprising an automatic focusing device and said rotation control circuit comprising a logic control means and a control switch having first and second positions, said detecting signals being provided through said logic control means in accordance with the position of said operating member when said control switch is in said first position, and said detecting signals being provided through said logic control means in accordance with the position of said operating member and in accordance with the operating status of said automatic focusing device when said control switch is in said second position.

10. A focus adjusting device for a camera which uses the rotation of a motor shaft to move a photographing lens into focus, said device comprising:
 a movable ring movable to a plurality of positions, each of said plurality of positions specifying a direction of rotation of said motor and a speed of rotation of said motor;
 an operating position detecting member for detecting the position of operating member, and for generating detection signals in accordance with said detected position; and
 a rotation control circuit for receiving said detection signals and rotating said motor shaft in said direction and speed corresponding to said position of said operating member.

11. A focus adjusting device for a camera which uses the rotation of a motor shaft to move a photographing lens into focus, said device comprising:
 an operating member movable to a plurality of positions, each of said plurality of positions specifying a direction of rotation of said motor and a speed of rotation of said motor;
 an operating position detecting member for detecting the position of said operating member and for generating detection signals in accordance with said detected position, said operating position detecting member comprising variable resistance means, the resistance of said variable resistance means varying in accordance with the position of said operating member; and
 a rotation control circuit for receiving said detection signals and rotating said motor shaft in said direction and speed corresponding to said position of said operating member, said rotation control circuit comprising a pulse width modulation circuit for supplying width-varying pulses of current to said motor, said pulse widths varying in accordance with the resistance of said variable resistance means.

12. A focus adjusting device for a camera which uses the rotation of a motor shaft to move a photographing lens into focus, said device comprising:
 a rotation control circuit for rotating said motor shaft in a direction and speed in accordance with control signals;
 automatic focus control means for generating a first set of signals;
 manually operable means for generating a second set of signals, said manually operable means including control means movable from a rest position and detection means for detecting the position of said control means and generating said second set of signals for moving said motor at a speed proportional to the amount of movement of said control means from said rest position; and
 selection means for selectively passing either of said first or second sets of signals to said rotation control circuit as said control signals.

13. A device as claimed in claim 12, wherein said control means comprises a rotatable focusing ring.

14. A device as claimed in claim 12, wherein said control means comprises at least first and second push buttons, each push button corresponding to a different direction of motor shaft rotation, with the speed of rotation of said motor shaft being proportional to the amount of movement of each push button from its respective rest position.

* * * * *